United States Patent [19]
Sadowski

[11] Patent Number: 6,007,069
[45] Date of Patent: Dec. 28, 1999

[54] MECHANICAL FACE SEAL

[75] Inventor: Richard P. Sadowski, Algonquin, Ill.

[73] Assignee: John Crane Inc., Morton Grove, Ill.

[21] Appl. No.: 08/955,423

[22] Filed: Oct. 22, 1997

Related U.S. Application Data

[63] Continuation of application No. 08/414,576, Mar. 31, 1995, abandoned.

[51] Int. Cl.$^6$ ..................................................... F16J 15/36
[52] U.S. Cl. ......................... 277/374; 277/384; 277/393
[58] Field of Search .................................. 277/370, 371,
277/374, 375, 377, 379, 384, 385, 391, 393

[56] References Cited

U.S. PATENT DOCUMENTS

| | | |
|---|---|---|
| 1,063,633 | 6/1913 | Wilkinson . |
| 1,561,426 | 11/1925 | Fischbacher ............................. 277/88 |
| 1,780,248 | 11/1930 | Spreen ..................................... 277/90 |
| 2,000,341 | 5/1935 | Larsh ....................................... 277/90 |
| 2,014,932 | 9/1935 | Hallett ...................................... 277/90 |
| 2,167,669 | 9/1939 | Molyneux . |
| 2,189,197 | 2/1940 | Cerny ....................................... 277/42 |
| 2,249,930 | 7/1941 | Bailey et al. . |
| 2,267,994 | 12/1941 | Reynolds et al. . |
| 2,299,590 | 10/1942 | Reynolds . |
| 2,322,834 | 6/1943 | Dornhofer . |
| 2,393,260 | 1/1946 | Pardee . |
| 2,446,243 | 8/1948 | Reynolds . |
| 2,465,546 | 3/1949 | Marslek . |
| 2,814,512 | 11/1957 | Quinn et al. . |
| 2,866,656 | 12/1958 | Dobrosavljevid . |
| 2,994,547 | 8/1961 | Dohlun et al. . |
| 3,024,048 | 3/1962 | Kobert . |
| 3,061,318 | 10/1962 | Laser . |
| 3,131,943 | 5/1964 | Mueller . |
| 3,203,704 | 8/1965 | Mueller ..................................... 277/42 |
| 3,332,692 | 7/1967 | Mueller ..................................... 277/42 |
| 3,391,939 | 7/1968 | Mueller ..................................... 277/42 |
| 3,391,941 | 7/1968 | Donley ..................................... 277/63 |
| 3,507,504 | 4/1970 | Donley ..................................... 277/83 |
| 3,575,424 | 4/1971 | Taschenberg .............................. 277/27 |
| 3,895,811 | 7/1975 | Richard, Jr. et al. ..................... 277/41 |
| 3,948,533 | 4/1976 | Novosad ................................. 277/81 R |
| 4,275,889 | 6/1981 | Butler et al. .............................. 277/42 |
| 4,700,041 | 10/1987 | Morita et al. . |
| 4,754,981 | 7/1988 | Burns ........................................ 277/38 |
| 4,779,876 | 10/1988 | Novosad ................................. 277/81 R |
| 5,199,719 | 4/1993 | Heinrich et al. .......................... 277/40 |
| 5,226,787 | 7/1993 | Freeman ................................... 277/56 |
| 5,492,340 | 2/1996 | Lederman . |

FOREIGN PATENT DOCUMENTS

| | | | |
|---|---|---|---|
| 0144296 | 11/1951 | Australia ................................. 277/90 |
| 0006115 | 9/1906 | United Kingdom ..................... 277/90 |
| 308391 | 3/1929 | United Kingdom . |
| 0548051 | 9/1942 | United Kingdom ..................... 277/90 |
| 799010 | 7/1958 | United Kingdom . |

*Primary Examiner*—Randolph A. Reese
*Assistant Examiner*—John L. Beres
*Attorney, Agent, or Firm*—Dorn, McEachran, Jambor & Keating

[57] ABSTRACT

A mechanical end face seal for sealing between a housing and a relatively rotating shaft which seal includes a pair of relatively rotating annular rings having seal faces in sealing contact with each other to define a seal interface, with one of the rings adapted to be secured to said shaft for rotation therewith, and the other fixed relative to the housing and one being axially movable toward the other. A generally annular flexible metal diaphragm secured between the axially movable ring and either the housing or shaft includes a generally radial disc-like central portion which defines a plurality of annular convolutions formed by protrusions extending in opposite axial directions. The diaphragm is pressed onto a cylindrical surface on the ring at about the center of mass of the ring. The surface includes a coating of a compound including PTFE, grit and a binder. In one form, the seal utilizes a second seal ring pressed into fluid tight relation with its associated carrier at about the center of mass of the ring. In another form, a seal ring is provided which is secured to its associated carrier in fluid tight relation utilizing welding techniques. The associated methods are disclosed.

13 Claims, 4 Drawing Sheets

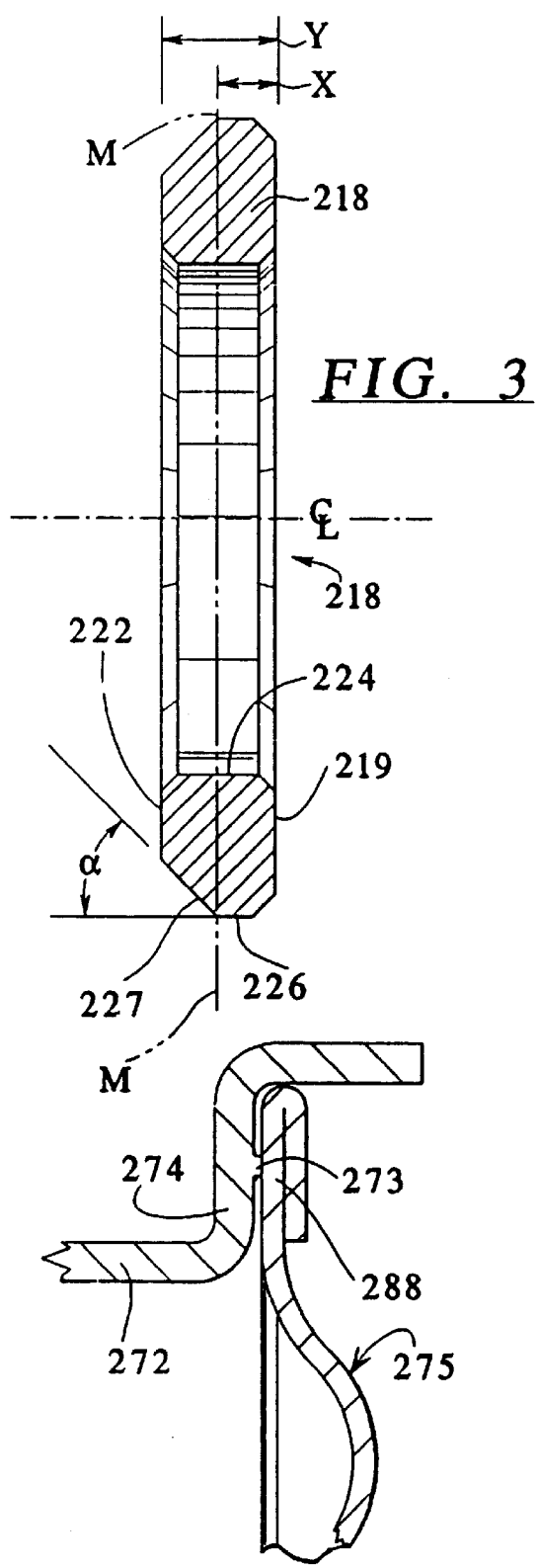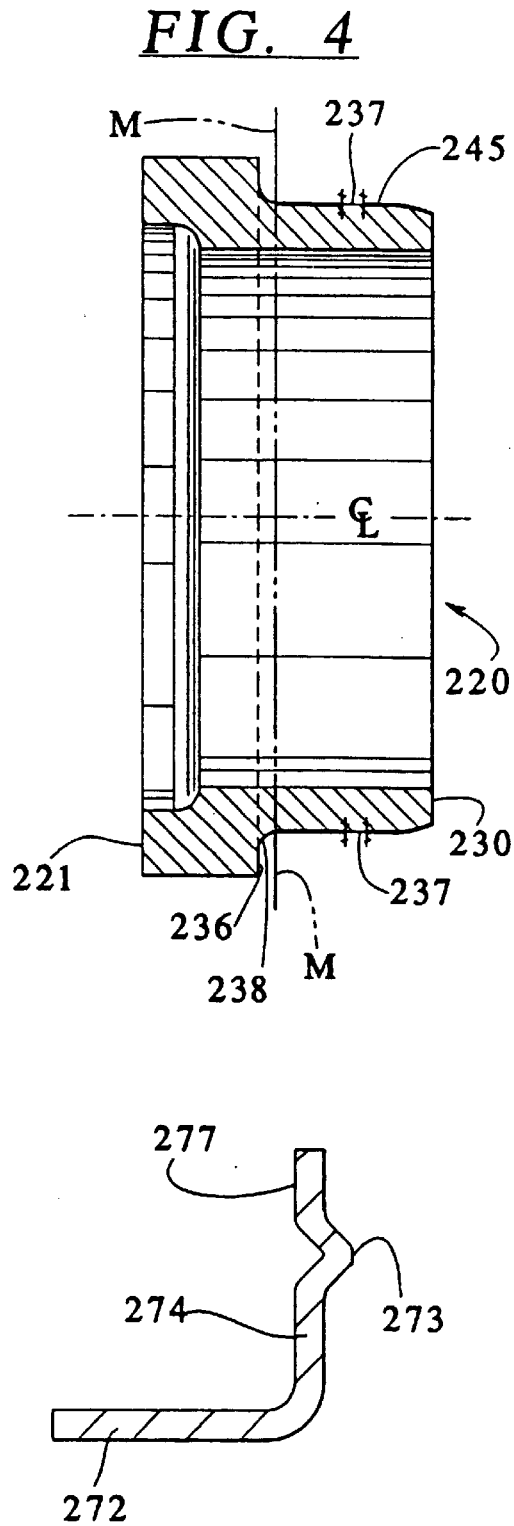

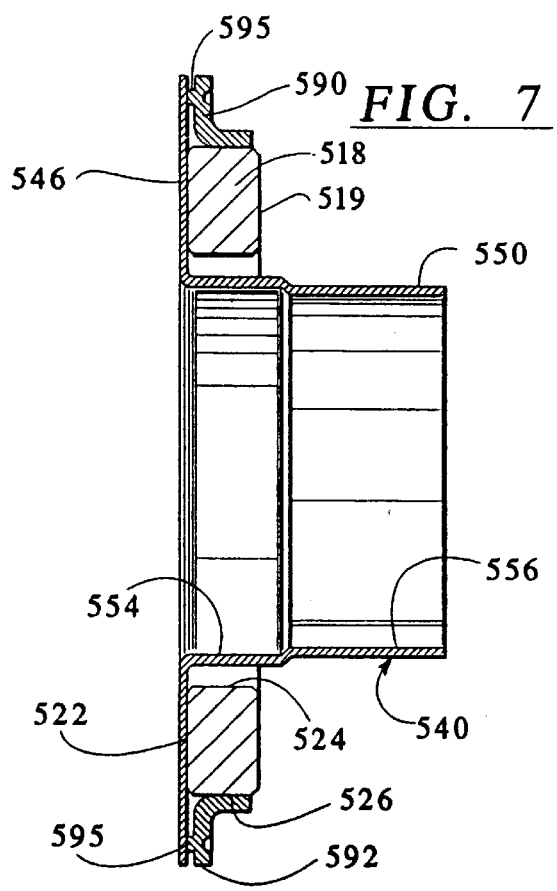
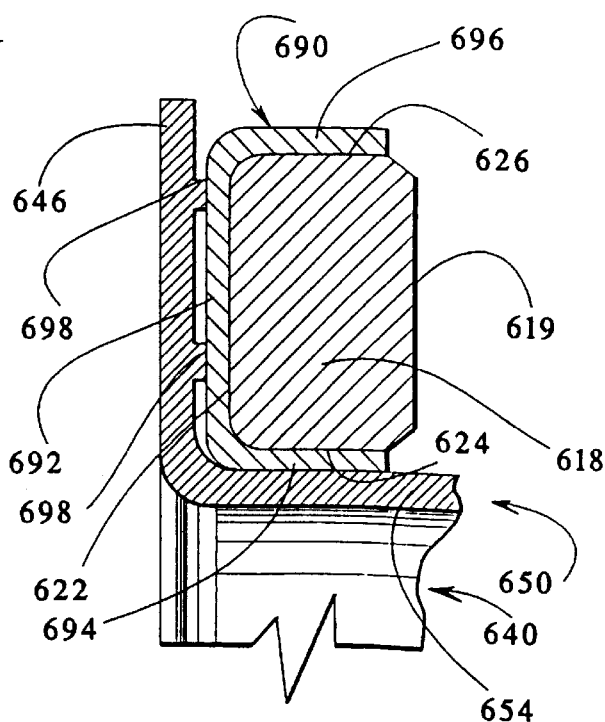
FIG. 7
FIG. 8
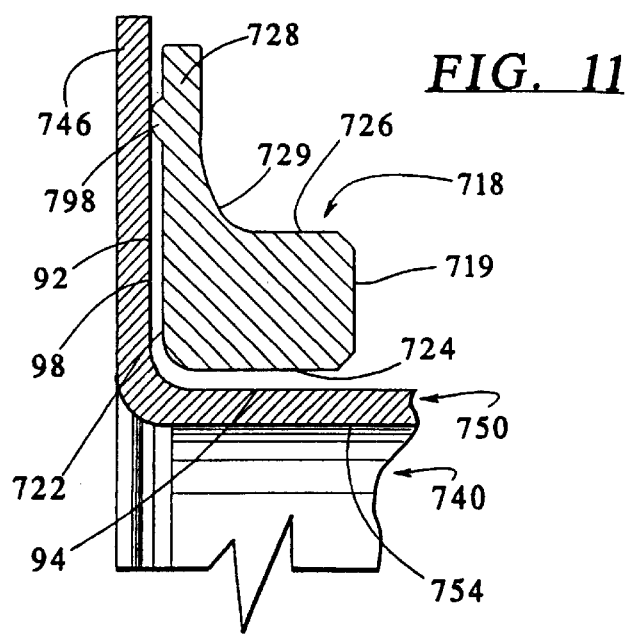
FIG. 11

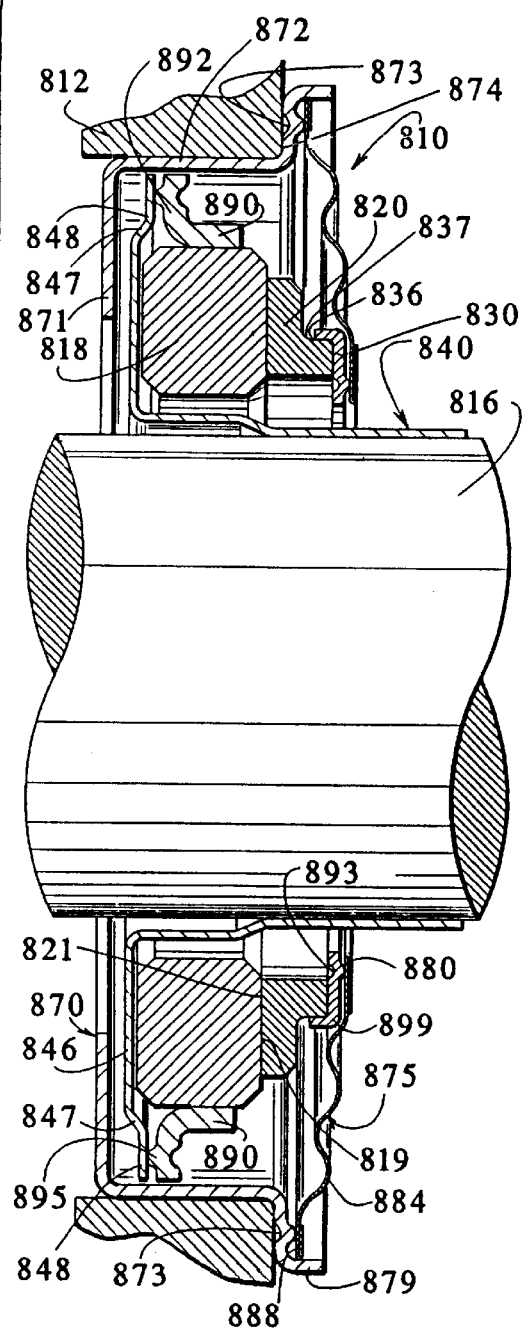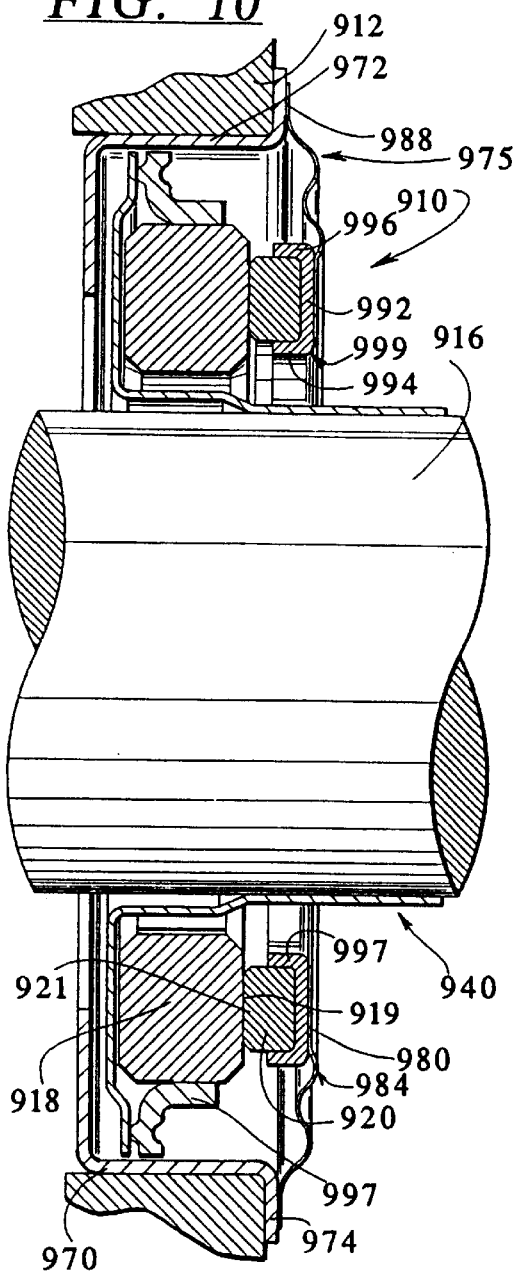

MECHANICAL FACE SEAL

This is application a continuation of application Ser. No. 08/414,576 filed on Mar. 31, 1995, now abandoned.

BACKGROUND OF THE INVENTION

1. Field of the Invention

This invention relates generally to mechanical end face seals for sealing between a housing and a relatively rotating shaft and more particularly to such seals having a metal diaphragm which provides axial loading of the seal rings and also acts as a secondary seal between one of the seal rings and its associated housing or shaft.

2. Background Art

Mechanical end face seals which provide a fluid-tight seal between a housing and a relatively rotating shaft find general application to a variety of devices, such as liquid pumps, slurry pumps, dry mixers and numerous other devices. Low cost end face seals are used, for example, in a number of high volume applications such as automobile water pumps. Applications involving other process fluids are also common.

Face seals usually comprise two seal rings, having opposed sealing faces, one of which rotates relative to the other. A biasing force is normally provided to urge one seal ring toward the other and to bring the two sealing faces into sealing relation. Secondary seals in some form seal each ring to its associated shaft or housing.

An example of a seal using a coil spring to provide the biasing force can be found in U.S. Pat. No. 3,282,235. A seal using a wave spring is shown in U.S. Pat. No. 4,754,981. These seals use some type of elastomeric component for providing the secondary sealing function. The latter seal is unitized, in that it can be installed into a pump as a unit or sub-assembly.

Seals are known in which the axial bias and the secondary seal between the movable ring and its associated housing or shaft is provided by an annular metal diaphragm or bellows. Such seals generally have higher temperature capability than those using an elastomeric secondary seal as well as potentially having better uniform circumferential loading. Examples of such seals are found in U.S. Pat. Nos. 2,189,197; 3,203,704; 3,332,692 and 3,575,424.

Seals using diaphragms of formed metal are not without complexity. The diaphragm or bellows must be connected to the seal ring and the housing or shaft with which it is associated in fluid-tight relation. These connections pose manufacturing and assembly problems.

Formed metal bellows have traditionally taken the shape of a truncated cone which, when the seal is installed, is placed in compression. Such shapes generally provide a high spring rate which can necessitate high initial face loading with consequent wear. Such seals may experience short life due to loss of adequate closing force as face wear progresses. Also, face loading varies significantly depending on diaphragm deflection. Leakage sometimes results from relaxation of the diaphragm through axial seal ring movement.

Simplicity of installation and removal of seals often dictate cartridge type arrangements which allow all of the seal elements to be preassembled and installed as a unit. There is also the desire to minimize the axial length of the seal assembly thereby minimizing the overall length requirement of the shaft. Reduction in shaft length simplifies bearing requirements and reduces the overall length of the pump or other device in which the seal is utilized.

The present invention incorporates an annular metal diaphragm in a seal assembly such that axial loading of the axially movable seal ring is applied by placing the diaphragm in tension. The diaphragm configuration provides greater flexibility and a resultant spring rate which insures adequate closing force over an acceptable range of axial displacement. This flexibility permits lower initial preload and therefore accommodates a narrow face width configuration. The narrow face width configuration, in turn, avoids potential thermal distortion problems.

The relationship of the component parts results, if desired, in a cartridge configuration. This embodiment utilizes a sleeve and retainer, each associated respectively with one of the seal rings. The metal diaphragm forms one closure wall of the cartridge. The entire seal assembly is essentially defined by the axial extent of the metal body of the primary ring retainer with the seal rings contained between a wall of the retainer and the metal diaphragm.

SUMMARY OF THE INVENTION

Accordingly, this invention provides for a mechanical end face seal for sealing between a housing and a relatively rotating shaft which seal includes a pair of relatively rotating annular rings having seal faces in sealing contact with each other to define a seal interface, with one of the rings adapted to be secured to the shaft for rotation therewith, and the other fixed relative to the housing with one being axially movable toward the other.

A generally annular flexible metal diaphragm connects to one ring. The diaphragm includes a generally radial disc-like central portion which defines a plurality of annular convolutions formed by protrusions extending in opposite axial directions. The diaphragm is configured to provide a load/deflection relationship which assures effective axial loading of the seal rings at the seal interface without imparting undue face loading.

The generally annular flexible metal diaphragm is secured to the inboard end of the retainer and to its associated seal ring in fluid-tight relation. The diaphragm is pressed onto a cylindrical surface of the ring at about the axial center of mass of the ring. The surface is provided with a coating which assures a fluid tight relationship and accommodates torsional loads.

The seal assembly of the present invention, in one form, utilizes a seal ring pressed into fluid tight relation with its associated carrier at about the center of mass of the ring. The ring is configured to accomplish such connection with resultant minimal radial and circumferential distortion.

In another form, a seal ring is provided which is secured to its associated carrier in fluid tight relation utilizing projection welding techniques. The intention includes the associated methods of making the seal assembly and its components.

BRIEF SUMMARY OF THE DRAWINGS

FIG. 3 is a cross-sectional view of the mating ring component of the seal assembly of FIG. 1.

FIG. 4 is a cross-sectional view of the primary ring component of the seal assembly of FIG. 1.

FIG. 5 is a fragmentary cross-sectional view on an enlarged scale of components of the embodiment shown in FIG. 1 during an assembly stage.

FIG. 6 is a fragmentary sectional view on an enlarged scale of a modified form of that portion of the apparatus shown in FIG. 5.

FIG. 7 is a sectional view of a modified component for a seal assembly such as illustrated in FIG. 1.

FIG. 8 is a sectional view of a further modified form of the component illustrated in FIG. 7.

FIG. 9 is a sectional view of a further modified form of seal assembly embodying the present invention.

FIG. 10 is a sectional view of a further modified form of seal assembly embodying the present invention.

FIG. 11 is a fragmentary sectional view of a further modified form of component for a seal assembly as illustrated in FIG. 1.

DETAILED DESCRIPTION OF THE ILLUSTRATED EMBODIMENTS

Figure 1:
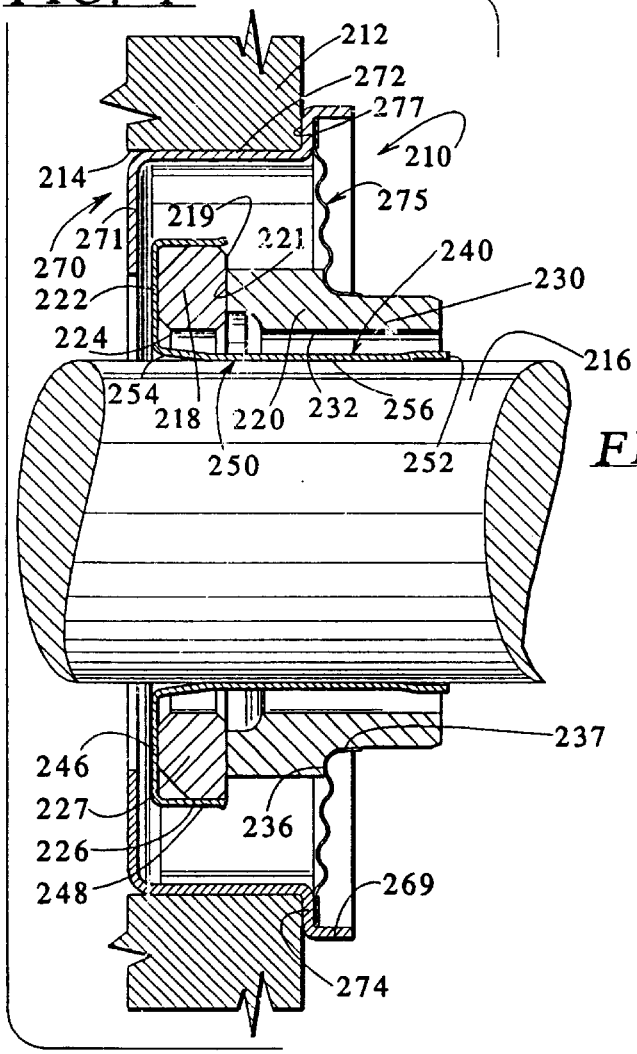
FIG. 1 is a cross-sectional view of a seal assembly employing a metal diaphragm and embodying the principles of the present invention.

FIG. 1 illustrates a seal assembly embodying the principles of the present invention. Seal assembly 210 is installed between a housing 212 having a bore or passage 214 through which a relatively rotating shaft 216 extends. The seal assembly provides a fluid-tight seal between the housing and the relatively rotating shaft.

The housing 212 may be a pump, compressor, mixer or other device in which a shaft extends through a surrounding housing. The housing of this illustrated embodiment is a pump, such as a water or other liquid pump, in which an impeller rotatable by the shaft elevates the pressure of the liquid to be sealed. It is contemplated, however, that the seal assembly 210 could have application in installations where a gas such as the atmosphere is present on both sides of the seal and the pressure is not elevated during operation. Examples of such installations include dry mixing vessels and bearing protectors.

In describing the illustrated embodiments, the term "inboard" is used to make reference to the pressure side of the pump and the term "outboard" is used to refer to the ambient conditions external to the pump, i.e., the atmosphere. In a non-pressurized application, "inboard" would refer to a position most near the bearing or other component to be protected by the seal assembly.

Though shown in cross-section, it should be readily apparent that the seal assembly components are annular, as are the various surfaces of these components which are described in detail.

The seal assembly of the illustrated embodiment of FIG. 1 includes a pair of annular sealing rings, comprising mating ring 218 and primary ring 220 associated respectively with shaft 216 and housing 212. These rings respectively define mating sealing faces 219 and 221 which are in facing, sealing relation and define a seal interface.

The ring elements 218 and 220 are shown as contained in carriers comprising a cylindrical sleeve 240 and an annular shell or retainer 270. In this embodiment these latter elements are configured to form a cartridge or unitary seal assembly which may be installed into position as a unitary component. It should be understood, however, in the most broad aspect of the invention, the seal assembly need not be unitized.

Mating ring 218, shown in FIG. 3, includes an annular radial surface 222 spaced axially outboard from radial sealing face 219. It also includes a radially inner cylindrical surface 224 having a larger diameter than the diameter of cylindrical sleeve 240 and a radially outer cylindrical surface 226. The ring 218 is provided with a conical chamfer 227 between outboard radial surface 222 and radially outer cylindrical surface 226.

Primary ring 220, shown in FIG. 4, includes inboard radial surface 230 spaced inboard of seal face 221. Ring 220 also includes an inner axial cylindrical surface 232 having a diameter larger than the cylindrical body of sleeve 240. Primary ring 220 includes inboard annular shoulder defined by radial surface 236 and axially extending cylindrical surface 237 joined by filet 238.

Referring to FIG. 1, shaft sleeve 240 supports mating ring 218 upon the shaft 216. Shaft sleeve 240 includes a tubular elongate portion 250. Tubular elongate portion 250 is formed to define outboard large diameter portion 254 and inboard shaft engaging portion 256, which is provided with slightly flared inboard end 252. Larger diameter outboard portion 254 is sized to freely receive an end of the shaft 216 on installation into a pump or other equipment. Shaft engaging portion 256 of shaft sleeve 240 is sized to frictionally engage the shaft 216 to retain the sleeve 240 and ring 218 in operative position on the shaft for rotation with the shaft. Flared end 252 is provided to cooperate with an installation tool as will be explained.

Sleeve 240 defines seal ring receptacle comprising retainer flange 246 which is radial and annular cup-shaped portion formed by axial cylindrical wall 248. Wall 248 has an inner cylindrical surface overlying outer cylindrical surface 226 of ring 218. Ring 218 is supported in fluid-tight engagement within the seal ring receptacle with radial wall 222 in contact with radial flange 246.

The mating ring 218 is press fit within the receptacle portion formed by radial flange 246 and cylindrical wall 248. An interference fit between outer cylindrical surface 226 of ring 218 and inner cylindrical surface of wall 248 of the receptacle has been found sufficient to maintain a fluid-tight contact with the mating ring 218 and to prevent relative motion between these elements.

The interference fit between ring receptacle cylindrical wall 248 and outer cylindrical surface 226 of ring 218 is initially established at the plane passing through the center of mass of the ring 218, axially between seal face 219 and radial surface 222 and extends to about seal face 219. This relationship provides contact between wall 248 and surface 226 over only half of the axial extent of the mass of the ring. It concentrates the radial compression of the ring such that it minimizes any radial or circumferential distortion of the ring 218. It is achieved by employing the large chamfer 227 which controls the location of the center of mass. This arrangement permits lapping of radial sealing face 219 prior to assembly of the ring 218 to sleeve 240.

The interference fit of outer cylindrical surface 226 and inner cylindrical surface of wall 248 is between 0.002 inches and 0.005 inches on the diameter of surface of wall 248. The wall 248 of sleeve 240 is about 0.015 to 0.020 inches in thickness.

Referring to FIG. 3, the chamfer 227 is at an angle of about 45 degrees to the ring centerline. The axial length "x" of outer cylindrical surface 226 is approximately one-half of the total axial extent "y" of ring 218 from face 219 to outboard radial surface 222. Thus, the chamfer 227 meets the outer cylindrical surface 226 about midway between sealing face 219 and radial surface 222. The chamfer is formed on about one-half of the axial extent of the ring 218 at its outboard end. This configuration places the initial contact between outer surface 226 and wall 248 at the axial center of mass of the ring. As shown in FIG. 3 plane M—M, transverse to the longitudinal centerline of the ring, passes through the axial center of mass the ring 218. Therefore, it defines equal masses on either side of the plane M—M, between the plane and respectively the face 219 and radial surface 222.

A fluid impervious sealant or coating is used to further protect against leakage and aid in resisting relative torsional movement between wall 248 and surface 226 of seal ring 218. A combination a fluoropolymer, grit and binder has been found effective. It is formed of PTFE, a grit such as silica (sand) and any suitable binder. A suitable product is sold under the name FLUOROPLATE by Orion Chemical Co., Chicago, Ill. Another material considered acceptable is LOCTITE, the adhesive sold by the Loctite Company, Chicago, Ill.

The primary ring 220 is supported relative to housing 212 by annular stamped metal primary ring retainer 270. The retainer 270 comprises an axially extending central body portion 272, a radially extending annular outboard radial wall 271 at its outboard end and an annular rim 274 extending radially outwardly from the inboard end of central body portion 272. Radial wall 271 defines a central aperture smaller than the outer diameter of flange portion 246 of sleeve 240 or of cylindrical surface 226 of ring 218. Rim 274 includes an axially extending cylindrical portion 269.

The axially extending central body portion 272 has a predetermined diameter which is received in the bore 214 of housing 212. The housing bore 214 is sized such that the central portion 272 may be press fit into the bore to create a fluid-tight relationship between the retainer 270 and the housing 212. The annular rim 274 includes an outboard facing surface 277 which seats against the interior or inboard surface of the wall of the housing 214 to provide a stop to precisely position the retainer 270 relative to the housing 212 and shaft 216.

In accordance with the principles of the present invention, primary ring 220 is supported in primary ring retainer 270 by a resilient metal diaphragm 275. Diaphragm 275 is generally annular in shape and extends generally radially of a centerline designated C-L in FIG. 2. The diaphragm is connected at its circumferential radially inner end portion to primary ring 220 and at its circumferential radially outer end portion to primary ring retainer 270. These connections are fluid-tight to prevent leakage of the process fluid from the housing 212.

Figure 2:
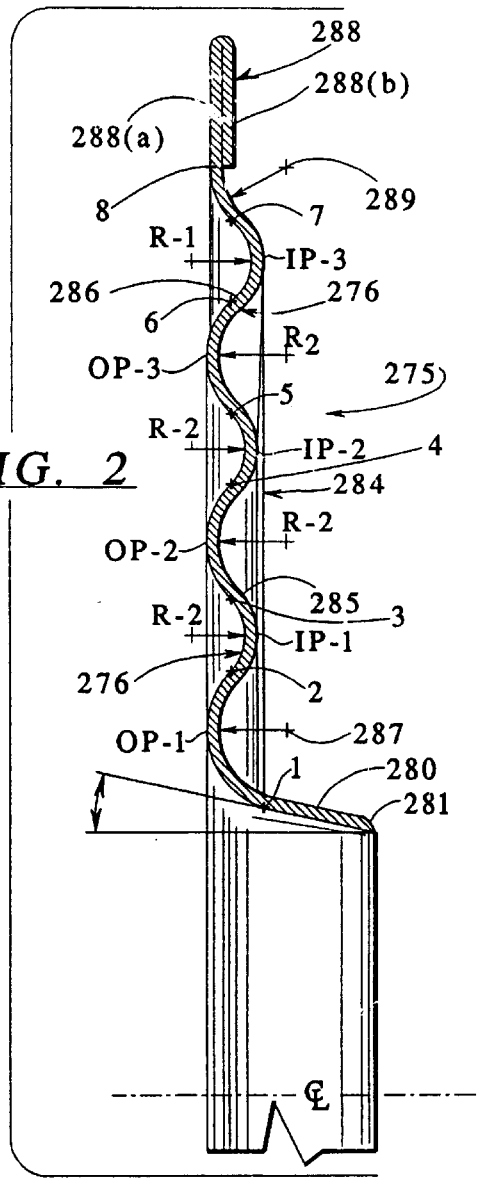
FIG. 2 is a cross-sectional view of a diaphragm for the seal assembly depicted in FIG. 1 and embodying the present invention.

Referring to FIG. 2, which shows the diaphragm in its free, or undeformed state, the circumferential radially inner end portion of diaphragm 275 is defined by inner, axially extending frusto-conical flange portion 280 converging axially in the inboard direction away from the ring interface and terminating in an inboard edge 281. The diaphragm 275 includes a generally radial disc-like central portion 284 having inboard surface 285 and an outboard surface 286. The diaphragm circumferential radially outer end portion is defined by a radially outer rim portion 288, which defines an outboard facing radial surface 288(a).

Rim 288, best seen in FIG. 2, is formed by folding an integral outer rim portion 288(b) onto integral inner rim portion which defines radial annular surface 288(a) to thus form a double thickness at the rim. This increased thickness is provided to enhance the welding characteristics of the rim and illustrates a feature incorporated into the diaphragm to enhance suitably for use of certain manufacturing techniques.

The outer peripheral diameter of rim 288 is slightly smaller than the inner diameter of axially extending cylindrical portion 269 of rim 274 of retainer 270. The disposition of rim 284 within the axially extending cylindrical portion 269 aids in the assembly process. The axial portion 269 is, however, an optional feature dictated by manufacturing considerations and does not alter function of the diaphragm of an operating seal assembly.

Best seen in FIG. 2, diaphragm generally radial disc-like central portion is formed with a plurality of annular convolutions 276 concentric about the diaphragm centerline and defined by radially spaced adjacent protrusions formed in opposite axial directions. The diaphragm central portion 284 includes three annular protrusions in the inboard direction integrally joined by annular protrusions in the outboard direction. The inboard protrusions define inboard crests designated IP-1, IP-2, and IP-3. The outboard protrusions define outboard crests designated OP-1. OP-2 and OP-3. The crests are, of course, circular about centerline C-L, since the diaphragm is an annular member.

As seen in cross-section in FIG. 2, the inboard protrusions and outboard protrusions are formed on radii and merge at the tangential intersection of the radii of adjacent protrusions to form convolutions. As best illustrated by the cross-sectional view of FIG. 2, the tangential intersections are represented by the mark "+" with reference to outboard surface 286. This is the juncture at which a line tangent to a protrusion in one axial direction is tangent to the adjacent protrusion in the other axial direction.

In cross-section, radial outermost, inboard protrusion IP-3 is formed on a radius R-1. The remaining inboard protrusions IP-2 and IP-3 and intermediate outboard protrusions OP-2 and OP-3 are each formed on a radius R-2. These radii meet at the previously described tangents to form a smoothly curved convolution of surfaces 285 and 286 of annular central portion 284 of diaphragm 275.

A curved transition portion 287, formed on a radius slightly larger than the radius of filet 238 on primary ring 220, forms innermost, outboard protrusion OP-1, and joins radial innermost, inboard protrusion IP-1 with inner axially extending conical flange portion 280 at a tangent point designated +-1 in FIG. 2. A further curved transition portion 289 also on a slightly larger radius joins radially outermost inboard protrusion with radially directed outer rim 288. Outboard surface 286 at radially transition portion 289 tangentially intersects radial outboard facing surface of rim 288 at mark +-8.

Radius R-1 is somewhat smaller than radii R-2. The central portion 284 with convolutions 276 is displaced slightly in the outboard direction from transition portion 289 to transition portion 287. It should be appreciated, however, that the number size of radius, and relationship between size of radius defining the convolutions may be varied to develop the desired load deflection relationship for a particular application of the seal assembly 210.

Referring again to the cross-sectional view of FIG. 2, mark +-2 represents the tangential intersection between the radially innermost outboard protrusion OP-1 formed by transition portion 287 and the radially innermost inboard protrusion IP-1 formed on radius R-2. Mark +-1 represents the tangential intersection of transition portion 287 with inner, frusto-conical flange portion 280. Marks +-3, +-4, +-5 and +-6 reflect the tangential intersection of the series of inboard and outboard protrusions IP-1, OP-2, IP-2, OP-3 and IP-3 formed in opposite axial directions and defining the remainder of the convolutions of the radial disc-like central portion 284 of diaphragm 275. Mark +-7 represents the tangential intersection of the radially outermost inboard protrusion IP-3 with curved transition portion 289. Curved transition portion 289, in turn, tangentially intersects with radially directed annular rim 288 at mark +-8.

Diaphragm 275 is formed to provide an acceptable load/deflection relationship throughout its expected range of deflections experienced in operation of the seal assembly 210 in a pump or other device to be sealed. The formation of the convolutions in the generally radial disc-like central portion 284 of the diaphragm provides this characteristic. In this regard, the tangential intersections +-2, +-3, +-4, and +-5 all lie in a single radial plane perpendicular to diaphragm centerline C-L and parallel to, and inboard of, the radial outboard surface 288(a) of rim 288.

Crests of the outboard protrusions OP-3, OP-2 and OP-1 at surface 286 all reside in a radial plane disposed slightly outboard of the radial plane of radial rim surface 288(a). The crests of inboard protrusion IP-1 and IP-2 at surface 285 reside in a single radial plane disposed inboard of the plane of rim surface 288(a). The crest of inboard protrusion IP-3 resides somewhat inboard of the radial plane passing through crests IP-1 and IP-2. The axial extent of the convolutions of the radial disc-like central portion 284 of the diaphragm 275 from the outboard extent of the surface 286 at the outboard protrusions to the inboard surface 285 at the inboard extent of the inboard protrusions is about 10 to 20 times the thickness of the diaphragm.

Primary ring 220 is secured to diaphragm 275 at axial flange portion 280. The flange portion 280 is received upon cylindrical surface 237 of the primary ring. The ring and diaphragm are connected by an interference fit between inboard directed flange 280 and the cylindrical surface 237. The transition portion 289 abuts the radial surface 236. The radius of the transition portion 287 is slightly larger than the radius of the filet 238 to insure tangential contact against both the cylindrical surface 237 and radial surface 236.

It is necessary that connection of diaphragm 275 and ring 220 be fluid-tight and also sufficiently strong to resist torsional loads which are imparted from the sliding movement between face 221 and mating face 219 of mating ring 218. To insure the fluid-tight interference fit, the inner diameter of flange 280 is smaller than the outer diameter of cylindrical surface 237 of the shoulder formed on primary ring 220. When these parts are interengaged, flange 280 deforms to accept surface 237.

The outer diameter of cylindrical surface 237 of the shoulder formed on primary ring 220 is sized to insure an interference fit with frusto conical portion 280 of diaphragm 275. This interference fit is about 0.010 to 0.015 inches on the diameter at tangent +-1 between protrusions OP-1 formed upon radius 287 and conical portion 280.

It is contemplated that, on assembly, the resilient nature of the diaphragm causes conical portion 280 to effectively resist withdrawal of the cylindrical surface 237, thus insuring a secure and fluid-tight connection which is sufficiently strong to resist torsional forces imparted between the relatively rotating sealing rings.

In this seal, a fluid impervious sealant or coating is used to further protect against leakage and aid in resisting relative torsional movement between diaphragm 275 and seal ring 220. A coating made from a fluoropolymer such as PTFE, grit such as silicon or sand, and a binder has been found effective. Grit of about 20 micron size has been found suitable. A suitable product is sold under the name FLUOROPLATE by Orion Chemical Co., Chicago, Ill. Another material considered suitable is LOCTITE, the adhesive sold by the Loctite Company, Chicago, Ill.

The coating, designated 245 in FIG. 4, is applied to cylindrical surface 237 prior to assembly of the diaphragm 275 with primary ring 220. The coating preferably represents a layer which covers the entire surface 237. The coating is applied in a thickness of about 0.002 to 0.003 inches prior to assembly of the diaphragm onto the surface 237 of primary ring 220.

The connection of diaphragm 275 to primary ring 220 at cylindrical surface 237 is such that compressive forces imparted to the ring are controlled to minimize distortion. The connection of flange 280 to cylindrical surface 237 commences at the axial center of mass of the ring between seal face 221 and radial surface 230 and extends in a direction away from seal face 221. The location of the axial center of mass is best illustrated in FIG. 4. Plane M—M, transverse to the longitudinal centerline of the ring 220, passes through the axial center of mass of the ring and is located at about the transition or tangency of cylindrical surface 237 with filet 238. The face distortion of such interference connection is thereby minimized.

Diaphragm 275 is connected to primary ring retainer 270 by welding. A fluid-tight welded joint exists between the rim 274 of the retainer 270 and outer radial rim portion 288 of diaphragm 275. It may be accomplished by projection welding, laser welding, seam welding or any other suitable method.

Projection welding is employed to connect the rim portion 288 of diaphragm 275 to rim 274 of retainer 270. An appropriate projection could be machined onto the radial surface of rim 274.

As illustrated, particularly in FIG. 5, to achieve a projection welded connection, rim 274 of retainer 270 is formed with an annular projection 273. Such a projection could, for example, be machined onto the radial surface of rim 274. Rim 288 portion of diaphragm 275 is positioned in overlying contact with projection 273. Appropriate welding electrodes contact the respective parts, and, upon passage of current, cause projection 273 to fuse to diaphragm rim 288 to form a fluid-tight connection.

FIG. 6 illustrates an alternative manner for formation of an annular weld projection. In this embodiment, the annular projection 273 is formed into a retainer rim 274 of uniform thickness. Such configuration can be achieved, for example, with an annular punch or die which impacts the outboard surface 277 of rim 274 to cause a protrusion in the inboard direction as illustrated. On welding, the projection 273 will fuse the rim 274 to the rim portion 288 of diaphragm 275.

During assembly, double walled rim portion 288 of diaphragm 275 is positioned in overlying contact with the projection. With outboard surface 288(a) in contact with annular projection 73 shown in FIG. 5 or 273 as shown in FIG. 6. Appropriate welding electrodes contact the respective parts and upon passage of current cause the projection to fuse to diaphragm rim portion 288. The double thickness of rim 288 provides increased quantity of metal for heat dissipation and improved welding characteristics to insure a fluid-tight joint. It is contemplated that during welding, the portions 288(a) and 288(b) will fuse into a single flange portion affixed to rim 274.

The materials of seal assembly 210 of the illustrated embodiment are the materials usually employed in such devices. Primary ring 220 may be made of carbon graphite, phenolic, bronze, PTFE impregnated bronze or silicon carbide. Mating ring 218 may be a ceramic such as alumina or silicon carbide, or it may be steam treated sintered iron. Any other suitable hard-on-hard or hard-on soft ring combination is within the scope of contemplated for the invention. Retainer 270 and sleeve 240 may be metal stampings formed of stainless steel.

It is contemplated the diaphragm 275 be suitably made as a stamping or roll formed part from stainless steel. It has been found that ASTM stainless steel 350 or 316L is suitable for use in the diaphragm 75. AM 350 is also a suitable stainless steel material for the diaphragm of the seals illustrated by the various embodiments shown. It is expected that the thickness of the diaphragm could range from 0.002 to 0.010 inches, or thicker, depending on shaft diameter and seal size.

When deflected and placed in tension, the diaphragm possesses the requisite resiliency to impart the axial closing force upon the axially movable primary ring 220 to urge it into sealing engagement with mating ring 218. Its disc-like shape, and convolutions, and its loading in tension assure a spring rate which is sufficiently linear throughout the expected operating range of deflection to properly load the seal faces.

The load/deflection curve is such that the initial preload is not so high as to require a large seal interface to distribute the face load experienced, even with maximum diaphragm deflection. It is contemplated that deflection could vary 0.035 to 0.050 inches or more through tolerance stack-up, shaft movement and the like. A minimum face preload is required to maintain a sufficient closing force at minimum diaphragm deflection. Therefore, if the load/deflection rate is high, an excessive face load will result at maximum diaphragm deflection. The configuration of the diaphragm of the present invention, however, provides a load/deflection relationship which is effective throughout the range of possible deflection. The interface area, therefore, need not be increased to accommodate high initial preload and consequently thermal distortion problems are avoided.

The diaphragm 275 is positioned such that generally radial central portion 284 closes off the inboard end of retainer body 270 at about the axial position of rim or flange 274. Thus, seal rings 218 and 220 are disposed within the confines of the retainer 270 between radial outboard wall 271 and diaphragm 275 connected to flange 274 at the inboard end.

Seal assembly 210 is assembled by disposing mating ring sleeve 240 with attached mating ring 218 within central body portion 272 of retainer 270. It is positioned with seal face 219 facing toward the inboard end of retainer body portion 272 and with mating ring retainer flange 246 in contact with radial wall 271 which captures it within the retainer body portion. Diaphragm 275 with primary ring 220 attached is then positioned at the inboard end of retainer body portion 272 with seal face 221 in contact with seal face 219 to form the seal interface between surfaces 219 and 221. The diaphragm 275 is then secured to retainer 270 by welding of rim 274 to rim portion 288 to complete the assembly with seal rings 218 and 220 captured between radial outboard wall 271 and diaphragm 275.

During assembly, with the diaphragm in its free state illustrated in FIG. 2 the length of central axial portion 272 of retainer 270 is such that when faces 219 and 221 are in contact and ring retainer flange 246 in contact with radial wall 271 rim portion 288 of the diaphragm 275 is spaced from rim 274 of retainer 270. Appropriate welding electrodes engage the rim portions 288 and 274 to bring them into contact for welding. This action causes resilient deflection of the diaphragm 275 to place it in tension and imparts an initial load onto the ring 220 urging it toward ring 218. Referring to FIG. 1, in relative terms, tension loading of the diaphragm 275 results from deflection of the generally radial disc-like central portion 284 of the diaphragm such that the radially innermost outboard protrusion OP-1 is moved in the inboard direction relative to its free state, increasing the axial distance between the circumferential portion of the diaphragm 275 connected to the housing retainer rim 274 and the circumferential portion of the diaphragm 275 connected to the cylindrical surface 237 of ring 220.

In the assembled condition of seal assembly 210 the faces 219 and 221 are in contact and radial rim retainer flange 246 is in contact with radial wall 271 of retainer 270. The diaphragm 275 is deflected in tension to maintain an initial load on the seal faces. The interface created between faces 219 and 221 is thereby protected against entry of foreign matter.

As illustrated, seal assembly of FIGS. 1 and 2, 210 is unitized. That is, the sleeve 240 and its associated mating ring 218 are captured within shell or retainer 270 between annular outboard radial wall 271 and diaphragm 275 and its associated primary ring. The assembly is inserted into the pump over a free end, not shown, of the shaft 216, which, in the instance of the illustrated embodiment, is inboard of the pump. Usually, a portion of the pump housing and the pump impeller are removed for access to the shaft end.

It should be understood that the present invention is equally applicable to a seal assembly configuration which is not unitized. It is merely necessary to eliminate the outboard radial wall 271 of retainer 270 to provide a seal assembly of two separate components, the sleeve 240 and its ring 218 and the retainer 270 and its ring 220 and diaphragm 275. In this form it is contemplated that retainer 275 could be made from tubing rather than stamped from flat sheet.

Seal assembly 210 is slid onto the shaft free end. This initial placement is eased by large diameter portion 254 of sleeve 240. Shaft engaging portion 256 of sleeve 240 is sized to fit tightly upon shaft 216 to fix the sleeve to the shaft. A certain minimum axial force is necessary to move the seal assembly to its installed position. Usually a tool is provided which applies such force to the inboard end 252 of shaft engaging portion 256. The tool also applies axial force to inboard surface of rim 288 of diaphragm 275 to apply axial force on rim 274 of retainer 270. The seal assembly is moved axially of shaft 216 and retainer central body portion 272 enters the bore 214 in housing 210. The central portion 272 is sized to be press fit into the bore to provide a fluid-tight relation. Sealant may be used to ensure a fluid-tight connection. An example of a suitable sealant is sold under the trademark LOCTITE by the Loctite Company of Chicago, Ill.

The tool is arranged such that axial movement of the sleeve 240 terminates prior to contact of surface 277 of rim 274 of retainer 270 with the wall of the housing 216. Movement of retainer 270 continues until surface 277 of rim 274 contacts the inboard surface of housing 212. The resultant relative axial movement of the retainer 270 and primary ring 220 to the sleeve 240 and mating ring 218 causes further deflection of the diaphragm 275 to place it in further tension, as previously discussed, between its connection to the rim 274 of central body portion 272 of retainer 270 and its connection to primary ring 220.

During installation, radial wall 271 moves away from ring retainer flange 246 to assume the relationship illustrated in FIG. 1. Generally radial disc-like central portion 284 of diaphragm 275 is resiliently deflected such that the radially innermost end of the diaphragm moves in the inboard direction relative to its free state to place the diaphragm in further tension. This increase in resilient deflection increases the restoring force of the deflected diaphragm and results in the application of the requisite axial preload on primary ring 220 urging face 221 into sealing relation with face 219 of mating ring 218.

As best seen in FIG. 1, with the seal assembly 10 in the installed position between housing 212 and shaft 216, the crests OP-3, OP-2, and OP-1 lie in a conical plane of revolution which converges at centerline C-L in the inboard direction. That is resilient deformation of the diaphragm radial disc-like central portion to its operative position, shown in FIG. 1, innermost outboard protrusion OP-1 has been moved the the inboard direction relative to radial outermost outboard protrusion OP-3.

When the seal assembly 210 is installed the diaphragm 275 is inboard of seal rings 218 and 220. Inboard radial surface 285 is exposed to the fluid to be sealed, which, when pump shaft 216 is rotating, is under pressure. The closing forces upon the seal interface are the sum of the force of the tension load on the diaphragm and the force created by fluid pressure acting on the inboard surface 285 of diaphragm 275 and radial surface 230 of ring 220.

In the embodiment of FIGS. 1 and 2, mating ring 218 is formed of silicon carbide or tungsten carbide. The ring is shaped and installed in retainer flange 246 as previously described to be employed in the illustrated interference or press fit configuration for attachment of the ring 218 to sleeve 240 with minimal radial or circumferential mechanical distortion. Such distortion, if present, could be transferred to face 219 and result in undesirable wear or failure through leakage at the seal interface.

An example of a seal assembly in the form illustrated in FIG. 1 has been constructed for a water pump having a shaft 0.625 inch in diameter. The pump pressure develops to about 20 psi. or at times as much as 50 psi.

The retainer 270 has an outer diameter of 1.440 inches at the cylindrical central body portion 272. It is pressed into a bore 214 which is slightly under 1.440 inches in diameter. The inner diameter of cylindrical portion 269 is 1.633 inches. The retainer has an axial length from surface 277 of rim 274 to the outboard surface of radial wall 271 of 0.338 inch.

Diaphragm 275 is made of AM-350 stainless steel. It is 0.003 inch thick. The outer diameter of rim 288 is 1.628 inches. The inner diameter of frusto-conical portion 280 at inboard end 281 is 0.851 inches. The angle of the conical portion 280 is 10 degrees to a line parallel to the central axis C-L of diaphragm 275.

Radial outermost, inboard protrusion IP-3 is formed on a radius R-1 which is 0.024 inches. The radius R-2 of the two additional inboard protrusions IP-2 and IP-1 and joining outboard protrusions OP-2 and OP-3 is 0.030 inch. The transition portion 287 which forms the radially innermost, outboard protrusion OP-1 and the transition portion 289, which joins the radially outermost inboard protrusion IP-3 with rim 288 are formed on a 0.035 inch radius.

The distance between the outboard radial surface 288(a) of rim 288 and the inboard surface 285, at the crest of radially outermost inboard protrusion IP-3, is 0.024 inch. The canted configuration of the generally radial disc-like central portion 284 places the plane passing through crests IP-2 and IP-1 at surface 285, 0.004 inch outboard of the crest of outboard protrusion IP-3. The radial plane passing through crest OP-1, OP-2 and OP-3 of the outboard protrusions at surface 286 is 0.003 inch outboard of the plane of radial surface 288(a) of rim 288. The distance measured along the central axis of the diaphragm 275 from the radial plane passing through crests OP-1, OP-2 and OP-3 at surface 286 to the inboard end 281 of frusto-conical portion 280 is 0.084 inch.

The points of tangency +-1 through +-8 are defined by the X–Y coordinates set forth below with X being the distance of the tangent mark from the plane passing through the crests of the outboard protrusions OP-1, OP-2 and OP-3 at surface 286 and Y being the radial distance from the longitudinal centerline C-L of diaphragm 275 to the tangent mark.

| Tangent Mark Coordinates |
|---|
| 8) X = 0.003343 |
| Y = 0.750683 |
| 7) X = 0.015041 |
| Y = 0.722417 |
| 6) X = 0.012740 |
| Y = 0.686420 |
| 5) X = 0.009358 |
| Y = 0.633950 |
| 4) X = 0.009358 |
| Y = 59152420 |
| 3) X = 0.009358 |
| Y = 0.542026 |
| 2) X = 0.009358 |
| Y = 0.499600 |
| 1) X = 0.033054 |
| Y = 0.434496 |

When the seal assembly 210 is installed between housing 212 and shaft 216 as illustrated in FIG. 1 the diaphragm is deflected about 0.035 inch from its free state. This deflection places the diaphragm in tension by displacing the innermost outboard protrusion IP-1 in the inboard direction relative to the rim 288. This deflection creates a restoring force which provides an axial preload force on the primary ring 220 of about eight pounds urging it toward mating ring 318. When the pump is activated, the sealed fluid is pressurized to approximately 20 pounds per square inch within housing 214. This pressure, acting on inboard surface 385, and inboard radial face 230, exerts an additional axial load of about twelve pounds urging ring 220 toward ring 218.

In seals of the type disclosed, as well as mechanical end face seal arrangements using other, previously known axial biasing arrangements, it is often desired to utilize a mating ring of silicon carbide or other ceramic which is banded with a metal band to impart compressive forces to the ceramic ring. Examples of such rings are found in U.S. Pat. Nos. 3,782,735 and 4,779,876.

FIGS. 7 and 8 illustrate banded ceramic mating ring assemblies which may be employed in the seal assembly of the embodiment of FIG. 1. These ring assemblies are illustrative of the advantages achievable using projection welding techniques. Mating rings made of other materials as previously discussed may also be supported as illustrated to take advantage of these welding techniques.

Referring to FIG. 7, there is illustrated a banded mating ring 518 of silicon carbide or other ceramic connected to a sleeve 540 to form a mating ring and seal subassembly which may be substituted, for example, for the sleeve and mating ring of the embodiment of FIG. 1.

Mating ring 518 defines annular seal face 519 for a relatively rotatable sealing engagement with, for example, face 221 of the primary ring 220 of FIG. 1. Mating ring 518 includes outboard radial surface 522 and radially inner and radially outer cylindrical surfaces 524 and 526.

Annular band 590 surrounds mating ring 518 about radially outer cylindrical surface 526. Band 590 may be made of stainless steel or other suitable material. It is intended to apply a compressive load to the mating ring 518.

The diameter of cylindrical outer surface 526 is larger than the inner peripheral diameter of band 590. An interference fit is thus created between these surfaces. This fit also insures that ring 518 will not rotate relative to band 590. Torsional loads associated with the relative rotation of mating ring face 519 with the face 321 of primary ring 320 are thus transferred to band 590.

Band 590 includes radial portion 592. A projection 595 is formed either in the manner illustrated by the projection 273 on rim 274 illustrated in FIG. 5 or in the manner illustrated in FIG. 6.

Mating ring sleeve 540 includes tubular elongate portion 550 and radial ring retainer flange 546. Tubular elongate portion 550 is comprised of enlarged diameter outboard portion 554 to aid in installation on a shaft (not shown) and shaft engaging portion 556 intended to frictionally engage a shaft to create a driving relation between the shaft and the sleeve 540.

Ring retainer flange 546 is of a diameter large enough to overlie projection 595 formed on radial portion 592 of band 590.

To assemble the mating ring and sleeve, band 590 is initially pressed onto mating ring 518. The mating ring inner cylindrical surface is then positioned onto the large diameter outboard portion 554 of the tubular elongate portion 550 with outboard radial surface 522 in contact with radial flange 546 of sleeve 540. Suitable electrodes are applied to cause projection 595 to be fused with radial flange 546. It is contemplated that the welding operation will significantly diminish, or eliminate the projection 595.

FIG. 8 discloses a modified arrangement of a banded mating ring and sleeve combination. This combination is also suitable for substitution into the embodiments of the seal assembly illustrated in FIG. 1.

Mating ring 618 defines seal face 619 for disposition in sliding sealing relation with a sealing face of a primary ring such as the face 221 of primary ring 220 of FIG. 1. Ring 618 also defines outboard radial surface 622 and radially inner and outer cylindrical surfaces 624 and 626.

Metal band 690 is channel shaped in cross-section. It surrounds seal ring 618 and includes radial wall 692 overlying outboard radial surface 622 of ring 618. It includes integrally formed radially innermost axial wall 694 engaged with surface 624 and radially outermost axial wall 696 engaged with radially outermost axial surface 626 of ring 618.

The radial spacing between walls 694 and 696 is such that the ring 618 is placed in compression between these walls. It is thought that such radially inward and radially outward compressive forces may improve the ability of the ring 618 to withstand operating stresses.

A sleeve 640 of the embodiment of FIG. 8 includes radial ring retainer flange 646. Two annular projections 698 are formed upon the inboard facing surface. They are spaced sufficiently such that each contacts radial wall 692 of band 690 somewhat radially inward of the juncture of wall 692 with the axially outer wall 696 and axially inner wall 694.

The inner peripheral diameter of radially inner axial wall 694 is such that it fits over the large diameter outboard portion 654 of tubular elongate portion 650 of sleeve 640.

To assemble the ring 618 onto sleeve 640 the projection welding process is employed to fuse the projections 698 to the radial wall 692 of band 690. Again, it is contemplated that the projections will be substantially eliminated during the welding process.

FIG. 9 illustrates yet another embodiment of a seal assembly 810 incorporating the principles of the present invention. As in earlier embodiments, seal rings 818 and 820 are respectively supported between shaft 816 and housing 812 by sleeve 840 and retainer 870.

The sleeve 840 retains mating ring 818 on shaft 816. It is essentially in the form of the sleeve depicted in FIG. 7 except for a slight modification of the ring retainer flange 846.

Ring 818 is a ceramic ring banded as in the embodiment of FIG. 7 by stainless steel band 890 which included radial portion 892 with projection 895. The other materials identified as suitable could be employed.

The flange 846 of the embodiment of FIG. 12 includes an outer annular, axially displaced radial portion 848 and integral transition portion 847 formed on an inboard directed angle relative to the radial ring retainer flange. This configuration is provided to aid in the manufacturing step of projection welding of projection 895 of radial portion 892 of band 890 to axially displaced radial portion 848 of ring retainer flange 846.

Retainer 870 is similar to the retainer depicted in the embodiment of FIG. 1. It includes an axial extending central body portion 872 and outboard radial wall 871. It includes radially directed rim 874 formed with radial portion 879. Rim 874 includes annular weld projection 873 similar to the projection illustrated in FIG. 5.

The primary seal ring is in a configuration that differs from prior embodiments. It comprises a seal ring 820 made of brass or PTFE impregnated sintered bronze which defines seal face 821 for relatively rotating sealing engagement with face 819 of mating ring 818. Ring 820 is provided with stainless steel band 899 of "L" shaped cross-section secured to its inboard end at a shoulder defined by radial surface 836 and cylindrical surface 837. Band 899 includes an axial portion press fit onto axial surface 836 of brass primary ring 820 and a radial portion formed with an annular projection 893.

Primary ring 820 with band 890 is supported in seal assembly 810 by metal diaphragm 875. Diaphragm 875 includes radial disc-like central portion 884 formed with convolutions defined by adjoining inboard and outboard directed protrusions.

Diaphragm 875 includes outer rim 888 formed of an integral portion folded over onto itself to define a double thickness. It further includes similarly formed radially inner rim 880.

The outer rim 888 of diaphragm 375 is secured to rim 874 of retainer 870 by projection welding. Inner rim 880 is secured to band 899 on primary ring 820. These connections are fluid-tight and made by projection welding. It is contemplated that the projections 873 and 893 are essentially flattened during the welding process. Also, the double thickness of rims 388 and 380 is intended to assure adequate metal available for the welding process. It is intended that the double thickness of each rim be fused to a single rim component during the welding operation.

In its installed condition diaphragm 875 is in tension to impart an axial preload onto the interface between seal faces 819 and 821. That is, the radially innermost end of the diaphragm is deflected in the inboard direction relative to its free state.

FIG. 10 depicts a further modified embodiment of a seal assembly in accordance with the principles of the present invention. Seal assembly 910 is disposed between housing 912 and shaft 916. Retainer 970 supports primary ring 920 within the housing.

Sleeve 940 secures a banded mating ring 918 for rotation with shaft. The sleeve 940 and banded mating ring 918 are configured as the sleeve 840 and banded mating ring of the embodiment of FIG. 9.

Seal rings 918 and 920 define seal faces 919 and 921 which define the seal interface. Metal diaphragm 975 is connected between flange 974 on retainer 970 and seal ring 920 in fluid-tight relation by welding. It includes a radial disc-like central portion 984 formed of inboard directed annular protrusions and integrally formed outboard directed annular protrusions. In the installed condition the radially innermost protrusion of diaphragm 975 is deformed in the inboard direction relative to its free state to place it in tension as in prior embodiments.

Primary ring 920 is made of brass and is generally rectangular in cross-section. It includes band 999 secured to its inboard end which is shaped similarly to band 690 of the embodiment of FIG. 8 and includes radial portion 992 and radially inner and radial outer axial walls 996 and 994. Made of stainless steel, band 999 is connected to ring 920 by an interference fit between the axial walls 996 and 994 and radial outer and inner axial surfaces of ring 920.

Diaphragm 975 includes radial outer ring 988 welded to rim 974 of retainer 970. It further includes generally radial disc-like central portion 984 formed with convolutions. Radially inner rim 980 is generally radial and is welded to radial portion 992 of band 999.

FIG. 11 discloses a modified arrangement of a mating ring and sleeve combination. This combination is also suitable for substitution into the seal assembly illustrated in FIG. 1, as well as other seal assemblies such as those employing spring biasing means, metal bellows, or the like.

Mating ring 718 defines seal face 719 for disposition in sliding sealing relation with a sealing face of a primary ring such as the face 221 of primary ring 220 of FIG. 1. Ring 718 also defines outboard radial surface 722 provided with projection 798. Ring 718 defines radially inner and outer cylindrical surfaces 724 and 726. It is made of steam treated iron and is, therefore, suitable for employment welding techniques.

A radially directed outer flange 728 portion is integrally formed upon mating ring 718. It is thin in relation to the axial extent of the ring between face 719 and radial surface 722. It merges with outer cylindrical surface 726 at radius 729. Its outboard surface is defined by outboard radial surface 726. Projection 798 is radially outboard of the major mass of the ring 718 at the relatively thin section represented by flange portion 728.

A sleeve 740 of the embodiment of FIG. 11 includes radial ring retainer flange 746. The inner diameter of radially inner cylindrical surface 724 is such that it fits over the large diameter outboard portion 754 of tubular elongate portion 750 of sleeve 740.

To assemble the ring 718 onto sleeve 740, the projection welding process is employed to fuse the projection 798 to the radial ring retainer flange 746 of sleeve 740.

The thin axial section of flange 728 simplifies the necessary locating and clamping mechanisms and welding electrodes. It also minimizes the power requirements to complete the weld. The weld will be fluid tight, thereby, obviating any form of secondary seal between the mating ring 718 and the sleeve 740. Again, it is contemplated that the projection 798 of mating ring 718 will be substantially eliminated during the welding process.

The embodiment of a mating ring and sleeve subassembly of FIG. 11 is illustrative of an application of projection welding techniques to the manufacture of components of mechanical face seals. The mating ring may take any suitable shape for a particular application of the seal without departing from the scope of the invention.

Various features of the invention have been shown in the drawings and described in the specification. It must be understood, however, that modifications may be made without departing from the scope of the invention defined by the appended claims.

I claim:

1. A mechanical end face seal assembly to provide a fluid tight seal between a housing defining a bore and a rotatable shaft extending through the bore, said seal assembly comprising, an annular seal ring adapted to be connected to one of the housing and shaft;

an annular seal ring adapted to be connected to the other of said housing and shaft;

said rings each having an annular, generally radially directed seal face in facing relation to the seal face of the other ring to define a sealing interface therebetween;

a generally annular, resilient, flexible metal diaphragm having a circumferential end portion for connection to one of said shaft and housing and a circumferential end portion connected to one of said seal rings;

said diaphragm being resiliently deformable to apply an axial biasing force upon said ring connected thereto to urge said seal face thereof toward the seal face of the other of said rings; and said diaphragm including a generally radial disc-like central portion having a plurality of convolutions defined by oppositely directed protrusions, a generally annular retainer connected to said circumferential end portion of said diaphragm for connection thereof to said one of said shaft and housing, wherein said retainer includes a radially directed rim and said circumferential end portion of said diaphragm connected to said retainer includes a peripheral rim secured to said radially directed rim of said retainer, said assembly further including a generally annular sleeve adapted to connect the other one of said rings to the shaft, and said retainer is adapted to connect said other of said rings to the housing, and wherein said circumferential end portion of said diaphragm connected to said retainer defines the radially outer circumferential end of said diaphragm and said circumferential end portion connected to said seal ring defines the radially inner circumferential end of said diaphragm, said ring connected to said diaphragm includes an axially extending cylindrical surface, said axially extending cylindrical surface includes a fluid impervious coating comprising PTFE, grit and a binder, intermediate said surface and said flange portion of said diaphragm, said circumferential end portion of said diaphragm connected to said ring defines an axially extending flange portion secured to said cylindrical surface of said ring by interference fit.

2. A mechanical end face seal as claimed in claim 1 wherein said axially extending flange portion is in contact with said cylindrical surface of said ring commencing at about the axial center of mass of said ring.

3. A mechanical end face seal assembly as claimed in claim 2 wherein said protrusions directed in a first axial direction define crests which lie in a common radial plane perpendicular to the centerline of said diaphragm.

4. A mechanical end face seal assembly as claimed in claim 3 wherein resilient deformation of said diaphragm causes said crests which lie in a common radial plane to lie in a conical plane converging at the centerline of said diaphragm.

5. A mechanical end face seal assembly as claimed in claim 2 wherein said one of said protrusions that merges with said circumferential end portion adapted for connection to one of said shaft and housing is formed on a radius smaller than the other protrusions defining said convolutions.

6. A sub-assembly for a mechanical end face seal which utilizes an annular ring to define a sealing face comprising,
   a.) an annular ring defining a radially directed sealing face and an annular radial surface spaced axially therefrom,
   b.) said ring having a radially outer cylindrical surface and a conical chamfer between said cylindrical surface and said annular radial surface,
   c.) a sleeve defining a receptacle having an axial cylindrical wall defining an inner cylindrical surface,
      said ring being supported by said receptacle with said outer cylindrical surface of said seal ring engaged with said inner cylindrical surface of said axial cylindrical wall by interference fit,
      wherein said interference fit commences at about the axial center of mass of said ring.

7. A sub-assembly for a mechanical end face seal as claimed in claim 6 wherein said chamfer is at an angle of about 45 degrees to the centerline of said seal ring.

8. A sub-assembly for a mechanical end face seal as claimed in claim 6 wherein said sub-assembly includes a liquid impervious sealant intermediate said radially outer cylindrical surface of said seal ring and said inner cylindrical surface of said axial cylindrical wall of said receptacle.

9. A sub-assembly for a mechanical end face seal as claimed in claim 6,
   wherein said chamfer meets said outer cylindrical surface of said seal ring about midway between said radially directed seal face and said annular radial surface.

10. A sub-assembly for a mechanical end face seal as claimed in claim 8 wherein said receptacle includes a radial flange and said seal ring is disposed in said receptacle with said annular radial surface thereof adjacent said radial flange of said receptacle.

11. A sub-assembly for a mechanical end face seal as claimed in claim 10 wherein said sleeve includes a tubular elongate portion adapted to frictionally engage a shaft and wherein said receptacle overlies said tubular elongate portion.

12. A sub-assembly for a mechanical end face seal as claimed in claim 9 wherein said receptacle includes a radial flange and said seal ring is disposed in said receptacle with said annular radial surface thereof adjacent said radial flange of said receptacle.

13. A sub-assembly for a mechanical end face seal as claimed in claim 12 wherein said sleeve includes a tubular elongate portion adapted to frictionally engage a shaft and wherein said receptacle overlies said tubular elongate portion.

* * * * *